(12) United States Patent
Long et al.

(10) Patent No.: US 7,277,448 B1
(45) Date of Patent: Oct. 2, 2007

(54) HIERARCHICAL SCHEDULER INTER-LAYER ELIGIBILITY DEFERRAL

(75) Inventors: Andrew A. Long, Northborough, MA (US); Christopher J. Kappler, Waltham, MA (US); Robert T. Olsen, Dublin, CA (US)

(73) Assignee: Cisco Technology, Inc., San Jose, CA (US)

( * ) Notice: Subject to any disclaimer, the term of this patent is extended or adjusted under 35 U.S.C. 154(b) by 965 days.

(21) Appl. No.: 10/608,795

(22) Filed: Jun. 27, 2003

(51) Int. Cl.
*H04L 12/56* (2006.01)

(52) U.S. Cl. .................................. 370/412; 370/444

(58) Field of Classification Search ........ 370/412–418, 370/444, 347; 712/214
See application file for complete search history.

(56) References Cited

U.S. PATENT DOCUMENTS

| | | | |
|---|---|---|---|
| 5,905,870 A | 5/1999 | Mangin et al. | 395/200.64 |
| 6,055,578 A | 4/2000 | Williams et al. | 709/253 |
| 6,198,722 B1 | 3/2001 | Bunch | 370/229 |
| 6,438,134 B1 * | 8/2002 | Chow et al. | 370/412 |
| 6,650,624 B1 | 11/2003 | Quigley et al. | 370/252 |
| 2001/0055319 A1 | 12/2001 | Quigley et al. | 370/480 |
| 2002/0126690 A1 * | 9/2002 | Narayana et al. | 370/444 |
| 2003/0112818 A1 * | 6/2003 | Schmidt | 370/414 |
| 2004/0064679 A1 * | 4/2004 | Black et al. | 712/214 |
| 2005/0002375 A1 * | 1/2005 | Gokhale et al. | 370/347 |

* cited by examiner

*Primary Examiner*—Chi Pham
*Assistant Examiner*—Albert T. Chou
(74) *Attorney, Agent, or Firm*—Bainwood Huang (57) ABSTRACT

Conventional schedulers propagate entries by either polling until an entry is ready, or alternatively, by attaching a so-called "readiness time" to entries. A scheduler which recognizes the readiness time avoids consuming a parent schedule with polling, or with burdening entries with a future readiness time. The system of the present invention employs a deferral queue for deferring entries in response to pop requests from a parent schedule. The child schedule defers entries via the deferral queue when it is not ready to push an entry to the parent schedule, and sets the readiness time corresponding to the entry. Upon the expiration of the readiness time, the child schedule redetermines whether to push the deferred entry corresponding to the deferral queue or optionally to push an interim entry having since arrived. Accordingly, a child schedule receiving a pop requests retains the ability to push an entry at an earlier or later readiness time, and further retains the ability to reconsider which entry to push.

23 Claims, 6 Drawing Sheets

HIERARCHICAL SCHEDULER INTER-LAYER ELIGIBILITY DEFERRAL

BACKGROUND OF THE INVENTION

In a conventional network system, an interconnection of data communications devices transmits message traffic between users. Such conventional data communications devices perform switching of message traffic to transport the message traffic from a source node to a destination node. Conventional message traffic typically includes a series of packets, each containing a source and destination address, corresponding to the source and destination nodes, respectively. Switching engines in conventional data communications devices read the address information in the packets, and switch the packets to an outgoing line corresponding to the destination node.

In such a conventional network, multiple data communications devices transmit a message packet between the source node and the destination node, in a series of "hops" along the interconnections. In such conventional data communications devices, the switching engines typically transport many packets corresponding to many different source and destination nodes. Accordingly, fast switching of the message packets is desirable to maintain message packet throughput, while minimizing the number of switching engines which the network employs for transporting the message traffic through the network.

Accordingly, conventional switching engines typically employ high-speed memory and processing circuits between a plurality of ingress and egress ports. The physical network interconnections connect to the ingress and egress ports, each of which in turn, connect to other data communications devices having conventional switching engines, or to the end-user nodes themselves. Therefore, the high-speed memory and processing control circuits in conventional switching engines switch the packets from the ingress ports onto the egress ports at a rate such that the switching engines avoid a bottleneck of message traffic.

Accordingly, such conventional switching engines employ a scheduler to facilitate message throughput through the data communications device. Such a scheduler manipulates the pending (queued) entries corresponding to message packets via a predetermined algorithm that quickly reads and interprets the address and other information in the packets. The scheduler then makes determinations, using the predetermined algorithm, concerning which message packets to transmit next on the egress ports. In this manner, a conventional scheduler prioritizes message traffic according to a variety of factors, such as packet address information, readable by such a conventional predetermined algorithm, in order to determine which packets to transmit and on which egress ports.

Conventional schedulers employ a variety of memory resources, data structures, and switching logic components to manipulate and manage the message packet throughput. Typically, the data structures include queues which store and order the message traffic according to scheduling logic. The scheduling logic orders and prioritizes the message traffic to determine the outgoing transmission order of the message traffic. Typically, service levels encompassing throughput rates, QOS (quality of service) minimums, rate limit maximums, and usage window guidelines are selectable by users, usually according to a fee based contractual obligation. Therefore, a service provider requires optimal queuing and servicing of message traffic according to the contractual obligations, as failure to maintain an agreed upon service level may have substantial repercussions for the service provider.

SUMMARY

Schedulers in conventional data communications devices employ a hierarchical data structure called a scheduling tree to organize, enqueue, and dequeue entries corresponding to message packets. The scheduling tree includes schedules, or calendars, each containing entries corresponding to message packets. The conventional hierarchical scheduling tree includes an arrangement of levels (layers), such that queued entries propagated from the leaf level, or level having the greatest fanout, to the root level, typically a single schedule immediately prior to the egress ports.

In such a conventional scheduler, schedules on adjacent levels have a parent/child relationship. This parent/child relationship associates a child schedule at a lower level with an entry in a parent schedule at the next highest level. Entries in the child schedule transition to the corresponding entry in the parent schedule according to the association. Such transitions, or transfers, occur according to the scheduling logic in a layer engine. The scheduling logic determines, for a given child schedule, which entry to propagate up to the parent schedule. Since a typical scheduling tree has many calendars at several levels, the conventional layer engine considers many calendars in a rapid matter to determine when to propagate, or push, an entry from a particular child schedule to the parent schedule.

Therefore, as the ingress message packets arrive as entries in the leaf nodes, or schedules, of the scheduling tree, the root schedule is dequeing egress entries for transmission on the outgoing ports. Accordingly, the layer engine is consistently transferring entries among the levels in the scheduling tree by moving the entries from child schedules to the corresponding parent schedule, which in turn propagate to the next level, or parent schedule, in the scheduling tree. In a conventional high-speed scheduler, such entries propagate rapidly through the scheduling tree, as the layer engine consistently considers, updates, and transfers the scheduled entries from child schedules to the parent schedules according to the conventional scheduling logic.

Parent schedules inform the layer engine when they are available to receive an entry from a child schedule i.e. when there is a vacant entry in the parent schedule due to a push to the parent's parent. The conventional layer engine then examines the child schedule to select an entry to propagate to the parent. Therefore, the parent requests to "pop," or remove, an entry from the child schedule, and the child schedule responds with a "push," or add, to transfer the entries, as driven by the conventional layer engine. Such push and pop events between the levels in the scheduling hierarchy are known as interlayer notifications.

However, a pop request from a parent schedule may encounter a null child schedule, or a child schedule without any eligible entries to push. Accordingly, the conventional parent schedule either polls (via the layer engine) the child until an entry is ready, or alternatively, accepts a pushed entry with a so-called "readiness time" attached. The readiness time indicates when the entry will actually become ready to dequeue to an egress port. Both of these conventional approaches can result in inefficient usage of scheduling resources, as a polling parent could be attempting to pop other schedules, and entries which propagate to the root prior to the readiness time occupy a slot for transmission which the layer engine may not dequeue onto the egress ports.

Accordingly, it would be beneficial to provide a mechanism for the child schedule to set a readiness time in response to a pop request, or available entry, from a parent schedule, and propagate, or push the entry at the scheduled readiness time set by the child schedule, rather than consume a parent entry with polling, or with a tentative entry burdened with the future readiness time. Allowing the child schedule to set the readiness time further allows the child to reconsider other entries, either at the readiness time, or the child schedule may reconsider other entries as they arrive. In this manner, the child schedule retains the ability to push a future entry in response to a pop request from the parent schedule, rather than conventional methods of burdening the parent schedule awaiting a child entry for the push.

The system of the present invention substantially overcomes the deficiencies outlined above in propagating, or pushing, entries from a child schedule to the parent schedule. The child schedule employs a deferral queue for deferring entries in response to pop requests from the parent schedule. The child schedule creates a deferral entry in the deferral queue when it is not ready, or eligible, to push an entry to the parent schedule. The child schedule sets the readiness time corresponding to the deferral queue entry. Upon the expiration of the readiness time, the child schedule redetermines whether to push an entry to the parent schedule, and further, whether to push the entry from the deferral queue or optionally to push an interim entry arriving in the child queue since computing the readiness time. Accordingly, a child schedule receiving a pop requests from a parent schedule retains the ability to push an entry at an earlier or later readiness time, and further retains the ability to reconsider which entry to push at the readiness time. The child schedule need not push the tentative entry from the deferral queue, but rather, may set another readiness time and retain the entry in the deferral queue.

The child schedule pushes entries to the parent schedule according to an eligibility determination which operates as a state machine, described further below. When a child schedule is not eligible to push an entry in response to a parent pop request, it has the option of creating a deferral entry in the deferral queue corresponding to an entry pending in the child schedule. In addition to the readiness time described above, a child schedule may become eligible by other criteria. In particular configurations, the scheduler considers factors including a minimum guaranteed rate, a maximum rate, and a flow control status. These criteria, described further below, may also effect wakeup events allowing the child schedule to reevaluate the readiness time and pending deferred entry.

The system of the present invention, therefore, effectively allows the child schedule to reevaluate and change the readiness time, rather than being bound by a previous readiness time regardless of subsequent scheduling availability. The layer engine employs a realtime event manager to allow the child schedule to report an empty status to the parent schedule in response to a pop request. The child schedule, in addition to responding empty, sends the tentative entry to the deferral queue, along with setting the readiness time. The realtime event manager awakens the child schedule at the readiness time to consider whether to push the previously deferred entry corresponding to the deferral entry in the deferral queue or alternatively, to push another entry from a child schedule that is more urgent. The real time event manager, therefore, allows the child schedule to wakeup at its own readiness time, and retain control over the ability to push an entry, rather than the conventional methods of relying on departure events in the parent schedule, or arrival events at a child (leaf) entry, in order to push an entry up to the parent schedule.

In further detail, the method and apparatus for managing interlayer notification events in a hierarchical scheduler receives, in a layer engine, a request to transfer an entry from a child schedule to a parent schedule, and determines, by a real time event manager in the layer engine, whether to defer, by creating a corresponding deferral entry in a deferral queue, the entry from the child schedule to the parent schedule. If the scheduler defers the entry, then upon subsequent wakeup by the real time event manager, the scheduler recomputes whether to transfer the deferred entry and, if the recomputing indicates retaining the deferred entry in the deferral queue, transferring another entry from the child schedule to the parent schedule.

In a particular configuration, deferring the child schedule entry by creating a corresponding deferral entry in the deferral queue further comprises computing a wakeup time corresponding to the time at which the recomputing will occur. The wakeup time allows the child schedule to retain control over the recomputing and transfer or defer a particular entry at the wakeup time. The layer engine creates a deferral entry corresponding to the deferred entry from the child schedule in the deferral queue if the determining indicates deferring the entry, and sets the wakeup of the child schedule in the realtime event manager for the computed wakeup time. The deferral queue entry may comprise a single entry corresponding to the child schedule, or several entries.

The recomputing, in particular configurations, further includes examining intervening entries in the child schedule, the intervening entries comprising entries arriving since the deferring. In maintaining control over the deferred entries, the child schedule may receive more urgent entries while the deferral entry is awaiting the wakeup time. The child schedule determines the more urgent event, and instead returns the newly arrived intervening entry as the push to the parent schedule.

Each of the schedules, in a particular arrangement, has a set of states, the states indicative of an active state, in which a schedule is available to transfer an event, an ineligible state, in which a schedule is pending a deferred entry, and an empty state, in which the schedule has no pending entries.

The parent schedule and child schedule initiate the transfer by the layer engine as a request to transfer, including a pop request indicative of availability in the parent schedule, and a corresponding deferral further including a "deferral ack" from the child schedule to the parent schedule. The child sends the deferral ack in response to the pop request, as an alternative to pushing an entry, when the child creates a deferral entry in the deferral queue. The pop request and the deferral ack further define states in the state machine, the deferral ack establishing a deferral state in the child schedule, the deferral state retained by the child schedule until the redetermining. The pop request further initiates a pending push state in the parent schedule, the pending push indicative of an available entry retained in the parent to receive an entry from the child schedule.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

DETAILED DESCRIPTION

The present invention substantially overcomes the drawbacks discussed above with respect to propagating, or pushing, entries from a child schedule to the parent schedule. In the system of the present invention, the child schedule employs a deferral queue in the scheduler for deferring entries in response to pop requests from the corresponding parent schedule. The child schedule, when no entries are available to push to the parent (i.e. not ready for transmission), instead defers entries in response to the pop request by creating corresponding deferral entries in the deferral queue because it cannot provide an entry which is eligible for transmission to the parent schedule. The child schedule sets the readiness time corresponding to the deferral queue entry. Upon the expiration of the readiness time, the child schedule redetermines whether to push an entry to the parent schedule, and further, whether to push the entry corresponding to the deferral queue entry or optionally to push an interim entry arriving in the child schedule since computing the readiness time. Accordingly, a child schedule receiving a pop request from a parent schedule retains the ability to push an entry at an earlier or later readiness time, and further retains the ability to reconsider which entry to push at the readiness time. The child schedule need not push the previously deferred tentative entry corresponding to the deferral entry in the deferral queue, but rather, may set another readiness time and retain such an entry in the deferral queue while pushing a more appropriate entry from the entries in the child schedule.

The system of the present invention, therefore, effectively allows the child schedule to change the readiness time, rather than being bound by a previous readiness time which remains unaffected regardless of subsequent scheduling availability. The layer engine employs a realtime event manager to allow the child schedule to report an empty status to the parent schedule in response to a pop request. The child schedule, in addition to responding empty, creates a deferral entry corresponding to the deferred entry, in the deferral queue, along with setting the readiness time. The realtime event manager awakens the child schedule at the readiness time or other eligibility time, described further below, to consider pushing the previously deferred entry corresponding to the deferral event entry from the deferral queue or alternatively, selecting and pushing another entry from the child schedule. The realtime event manager, therefore, allows the child schedule to wakeup at the readiness time or other eligibility time, and retain control over the ability to push an entry, rather than the conventional methods of relying on departure events in the parent schedule, or arrival events at a leaf entry, in order to push an entry up to the parent schedule.

Figure 1:
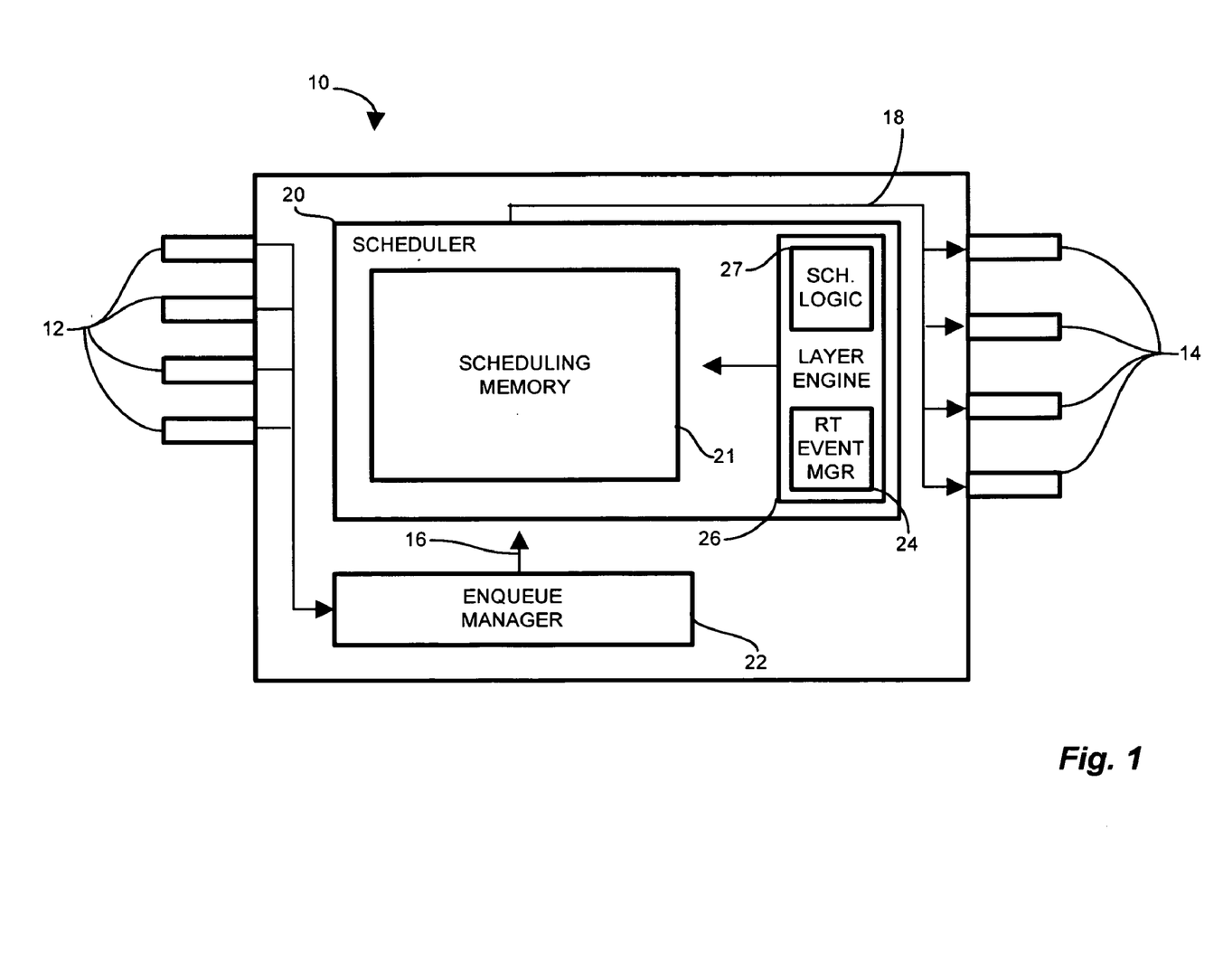
FIG. 1 is a block diagram of a data communications device having a scheduler suitable for use with the system of the present invention.

FIG. 1 is a block diagram of a data communications device 10 suitable for use with the system of the present invention. Referring to FIG. 1, the data communications device 10 has ingress ports 12 and egress ports 14 for transporting message throughput. The data communications device 10 includes a scheduler 20, scheduling memory 21, ingress lines 16 and egress lines 18, an enqueue manager 22, and a layer engine 26 having a realtime event manager 24 and scheduling logic 27.

The scheduler 20 couples to the enqueue manager 22 via the ingress lines 16, and to the egress lines 18. The enqueue manager 22 connects to the ingress ports 12, for receiving message traffic from other data communications devices (not shown), for example, via the Internet. The scheduler 20 also couples to the egress ports 14 via the egress lines 18. Further, the scheduler 20 and corresponding scheduling memory 21 is in communication with, and responsive to, the layer engine 26. The layer engine 26 includes the realtime event manager 24, operable for manipulating the scheduling memory 21 entries in a realtime, interrupt driven manner, and the scheduling logic 27, operable to select entries for transmission, as described further below.

In operation, the scheduler 20 receives, processes, and schedules the message packets from the ingress ports 12 for outgoing transmission. External entities, such as remote computer systems, send message packets to the ingress ports 12. The enqueue manager 22 receives the messages from the ingress ports 12, and enqueues them in the scheduler memory 21 in the scheduler 20 via the ingress lines 16. The scheduler 20 propagates the queued entries according to a hierarchical scheduling tree, described further below, to order and prioritize entries for outgoing transmission. The scheduler 20 dequeues entries, according to the layer engine 26, for transmission on the egress ports 14, via the egress lines 18. Accordingly, the layer engine 26 directs the scheduler 20 in manipulating scheduling entities from the ingress lines 16 to the outgoing lines 18. The realtime event manager 24 organizes and directs the layer engine 26 to manipulate particular entries in the scheduler 20 in a realtime, event driven manner, also described further below.

It should be understood that the data communications device 10 is capable of providing a variety of message traffic handling services. For example, suppose that different companies often enter service contracts for varying levels of service according to individual needs. Company A elects a 100 Mbps service, or line, with weekday only access. Further, as company A does not expect to exceed 100 Mbps, company A elects a rate limited service, meaning that the aggregate transmission rate may not exceed 100 Mbps. Company B, on the other hand Elects a 200 Mbps service, including a no rate limit option, at a slightly increased fee, which provides best effort traffic in the event that the other subscribers (company A) does not use the excess bandwidth. Further, as company B's employees the work on weekends, their service covers 24/7 access.

Accordingly, a data communications device 10 serving a building which both company A and company B occupy, requires a scheduler 20 which can serve both company A's and company B's needs. Therefore, the scheduling logic 27 in the layer engine 26 stores and computes information about packets enqueue by both company A and company B such that they each receive their minimum service requirements of 100 Mbps and 200 Mbps, respectively. Further, since company B has unlimited rate service and 24/7 coverage, company B is permitted to exceed 200 Mbps if company A does not require the excess bandwidth (assume that the data communications device 10 has a throughput rate of 300 Mbps). Therefore, if either company A has reached its 100 Mbps limit, or during a weekend, for example, then company B would be permitted to consume the remaining bandwidth. Accordingly, the layer engine 26 moves packets of company B through the scheduler before those of company A, in such a scenario.

Figure 2:
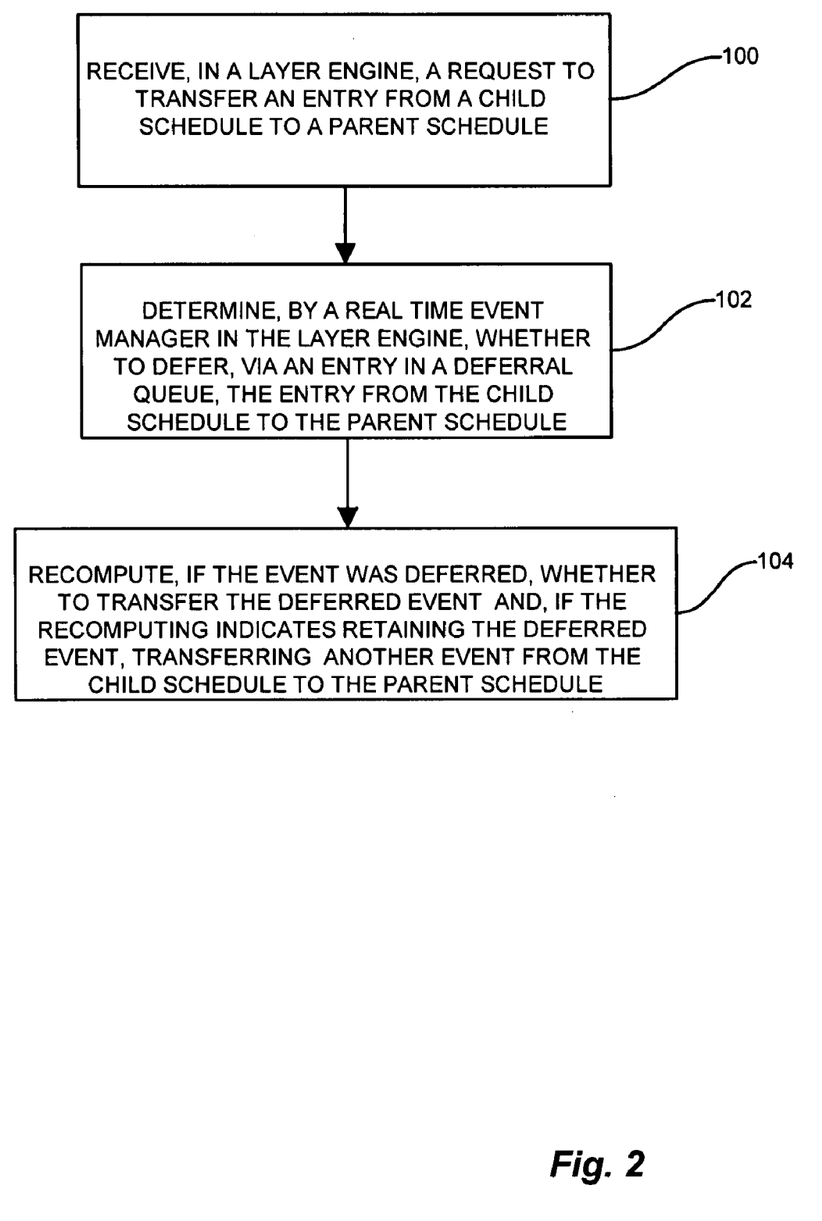
FIG. 2 is a flowchart of entry scheduling according to the scheduler of FIG. 1.

FIG. 2 is a flowchart of entry scheduling according to the scheduler of FIG. 1. Referring to FIG. 2, the system of the present invention is described managing interlayer notification events in a hierarchical scheduler. At step 100, the layer engine 26 receives a request to transfer an entry from a child schedule to a parent schedule (32c and 32g, respectively, discussed further below). The parent schedule 32c informs the layer engine 26 when it has a vacant entry available to receive an entry from a child schedule 32g. The scheduling logic 27 determines which of the entries in the child schedule 32g to transfer, or push, to the parent.

At step 102, a real time event manager 24 in the layer engine determines whether to defer, in a deferral queue, the entry from the child schedule 32g to the parent schedule 32c. Depending on whether the entry in the child schedule 32g is ready, the child schedule 32g elects to create and store a deferral entry corresponding to the entry 32g in the deferral queue and set a wakeup, or readiness time. The real time even manager 24 determines the readiness time based on when the entry will be ready for dequeing on the outgoing lines 18. The readiness time approximates when the entry will be ready for transmission, and hence for a push to the parent 32g.

At step 104, the layer engine 26 in the scheduler 20 recomputes, if the entry was deferred, whether to transfer the deferred entry and, if the recomputing indicates retaining the deferred event, transferring another entry from the child schedule to the parent schedule. Upon expiration of the readiness time, following a wakeup from the real time event manager 24, the child schedule 32g reconsiders the available entries to push to the parent 32c from among the available entries 33, including the entry 33 corresponding to the deferral entry in the deferral queue. Based on the scheduling logic 27, the child schedule 32g selects the best candidate for a push from among the available entries. The child schedule 32g may select an interim entry arriving since the deferral queue entry was made, or may select the entry previously sent to the deferral queue.

Figure 3:
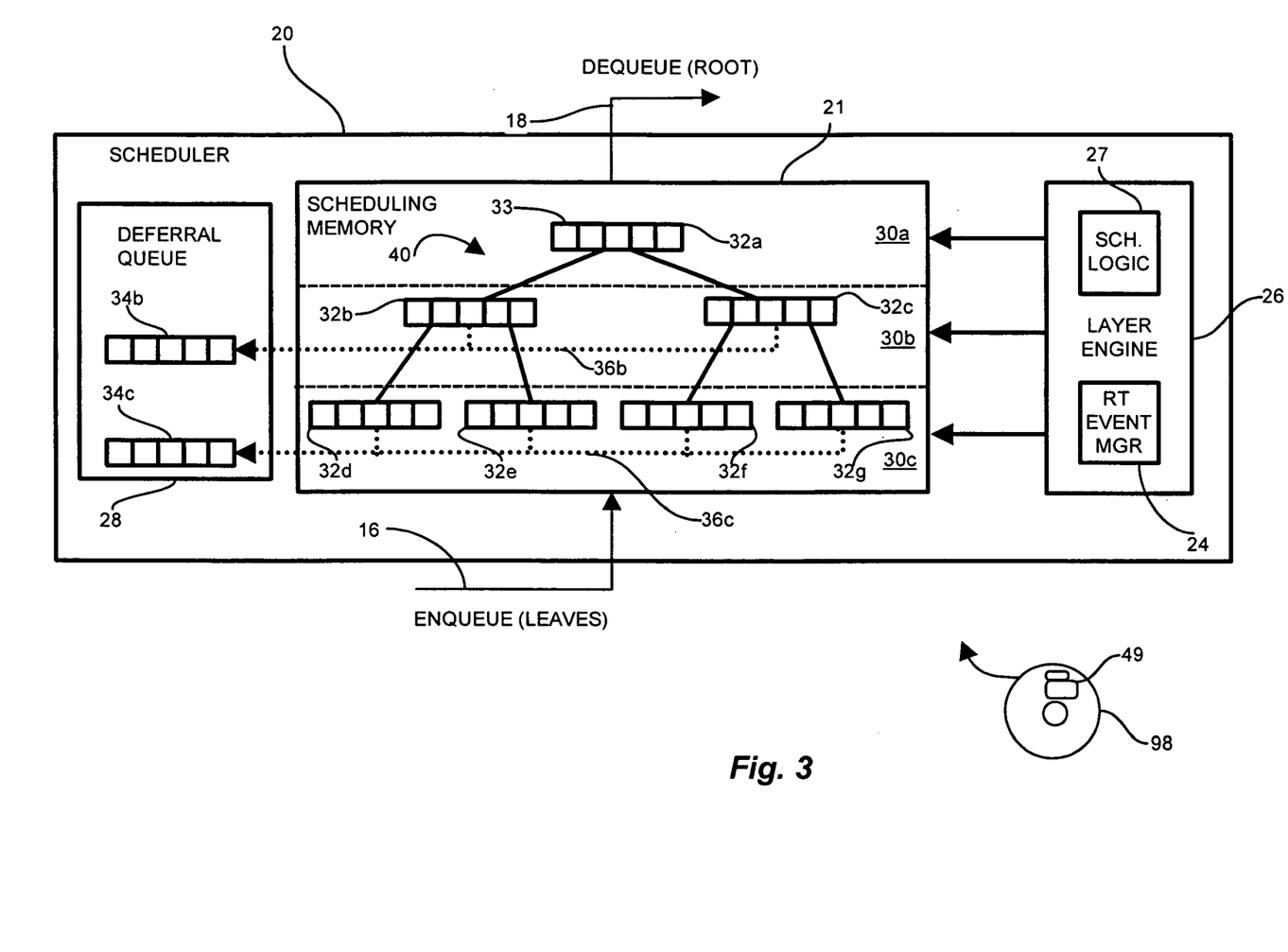
FIG. 3 shows the scheduler of FIG. 1 in greater detail.

FIG. 3 shows the scheduler 20 of FIG. 1 in greater detail. Referring to FIG. 3, the scheduling memory 21 in the scheduler 20 further includes a hierarchical scheduling tree 40. The hierarchical scheduling tree 40 includes a plurality of schedules 32a-32g (32n generally). The scheduler 20 organizes the schedules 32n into layers 30a-30c in the scheduling memory 21. Each of the schedules 32a-32g includes a plurality of entries 33. The layer engine 26 manipulates the entries between the layers 30a-30c. The scheduler 20 further includes the deferral queue 28. The deferral queue 28 includes deferral schedules 34b-34c, paralleling the corresponding levels 30b and 30c.

The exemplary data communications device 10 depicts an exemplary scheduler 20. The scheduling memory 21 is illustrated as having a plurality of layers in communication with the layer engine 26. The scheduling memory 21 operates to store enqueued entries corresponding to message packets. The entries are typically handles, or pointers, to a message packet payload stored elsewhere in the memory. Such bifrucation of message traffic is not illustrated for reasons of clarity; the entries 33 are representative of the entire message payload packet.

Further, the layer engine may comprise a plurality of layer engines 26 each serving a subset of the layers 30n. Such a plurality of layer engines 26 serves to distribute the overall computing load on the layer engines 26 and therefore, allows a particular data communications device 10 to provide greater throughput. The layer engine 26 applies the scheduling logic 27 to entries on levels 30n to which it corresponds, and transfers entries 33 from level to level by moving the entries 33 along the scheduling tree 40 in memory 21. Accordingly, the layer engine is operable to manipulate the scheduling memory 21 and entries 33 therein, according to the instructions stored in the scheduling logic 27. The real time event manager 24 is operable to interrupt the layer engine 24 for triggering conditions such as wakeup, described further below, which follow the scheduling logic.

The layers 30n, schedules 32n will now be discussed in terms of manipulating entries within the scheduling hierarchy. It should be understood that the later engine 26, according to the configuration just described, performs the actual manipulations within the scheduling memory 21. The layers 30n and schedules 32n are personified as operable to manipulate the scheduling memory 21 for convenience to avoid excessive and unillustrative reference to the layer engine 26.

The ingress lines 16 connect to the leaves 32d-32g, or bottom layer 30c of the scheduling hierarchy 40, for enqueue entries 33 from the enqueue manager 22. The schedules 32n each couple to a corresponding schedule 32n, or parent, on the next highest level 30n of the scheduling hierarchy tree 40. Therefore, the hierarchical scheduling tree 40 forms parent-child relationships between schedules 32n on adjacent levels 30n. As shown in FIG. 3, the schedules 32n on each level 30n fan in from the greatest number of schedules on the lowest level 30c, to a single schedules 32a on the highest level 30a. Note that a variety of scheduling hierarchy tree structures may be implemented, and need not be asymmetrical or bound by the number of schedules at each level 30n.

In operation, the layer engine 26 transfers entries from a child schedule, such as 32g, to a parent schedule 32c. The layer engine 26 examines a parent-child pair of schedules 32g and 32b on adjacent levels, and determines whether to transfer, or push, an entry 33 from the child schedule 32g to the parent schedule 32c. Typically, an entry 33 becomes vacant in the parent schedule 32c, which the layer engine 26 observes, and the child schedule 32g receives in the form of a pop request. The layer engine 26, after computing which entry in the child schedule 32g to transfer, pushes the entry to the parent schedule 32c. Further, the realtime event manager 24 schedules realtime push events from the child 32g to the parent 32c, as described further below.

The deferral queue 28 includes additional schedules 34b and 34c, each corresponding to a particular level 30b and 30c, respectively, and optionally to a particular schedule 32n on that level. For example, the deferral schedule 34b is responsive to the schedules 32b-32c on layers 30b, as shown by dotted line 36b. Similarly, the deferral schedule 34c is responsive to the schedules 32d-32g on layer 30c, as shown by dotted line 36c In a particular arrangement of the present invention, the realtime event manager 24 allows a child schedule 32g receiving a pop request for a parent 32c to schedule a realtime wakeup time specifying when to perform the push of the entry from the child schedule 32g to the parent schedule 32c. In this manner, the child schedule 32g defers a response to a pop request, while retaining control of the ability to do a responsive push, and further to specify the time, via the realtime event manager 24 as to when the push occurs. Further, the child schedule 32g may reexamine intervening entries 33 arising between the deferral and wakeup time, and elect to instead push the intervening entry 33 in schedule 32g, rather than the deferred entry 33 from the deferral queue 34c, as described further below.

The deferral queue 28 stores deferred entries 33 from a child schedule 32g pending the wakeup time set by the child schedule 32g. In response to a pop request from a parent schedule 32c, the child schedule 32g may either push an entry 33 is available, or may respond with a deferred push, and store the pending entry in the deferral schedule 34c. The realtime event manager 24 sets a wakeup time for the child schedule 32g to revisit the deferred entry in the deferral scheduler 34c. At the conclusion of the wakeup time, the realtime event manager 24 wakes up the child schedule 32g and the child schedule 32g pushes either a deferred entry 33 from the deferral queue schedule 34c, or a newly arrived entry from the child schedule 32g. It should be noted that that the child schedule 32g may elect to push any entry in the schedule 32g, or a deferred entry in 34c, however pre-existing entries 33 in 32g were known at the time the entry 33 was stored in the deferral queue 28, and therefore such entries 33 would have been stored in the deferral queue 34c as the most favored entry 33 for the next push to the parent to the 32c. After determining the entry 33 to push, the layer engine 24 transfers the selected entry from the child schedule 32g to the parent schedule 32c. In this manner, entries propagate through the scheduling tree 40 via transfers by the layer engine 26 from a particular level 30n to an adjacent level 30n.

Figure 4:
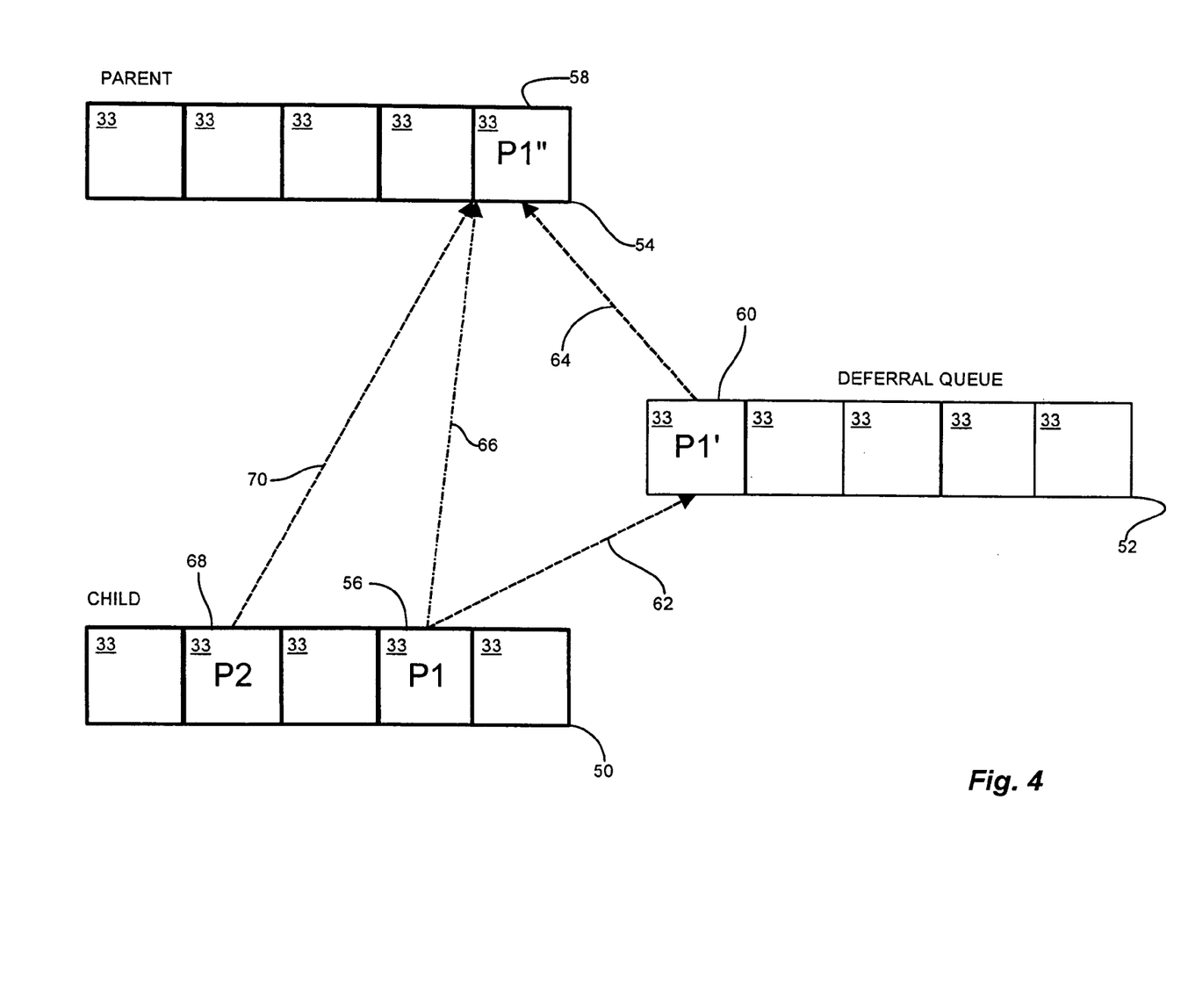
FIG. 4 is a data flow diagram of a deferred entry in the scheduler of FIG. 3.

FIG. 4 is a data flow of a deferred entry in the scheduler of FIG. 3. Referring to FIGS. 3 and 4, the parent and child arrangement includes a parent schedule 54, corresponding to parent schedule 30c above, and child schedule 50 corresponding to child schedule 30g above. The deferral queue 52 stores deferral entries corresponding to the child schedule 50 for deferred entries 33, as will now be described in greater detail. The exemplary parent 54 and child 50 schedules as shown correspond to a parent-child association as shown in FIG. 3, between schedules 32n on adjacent levels, such as parent 32c and child 32g in FIG. 3. Further, the exemplary deferral queue 52 corresponds to a deferral queue 28 schedule, such as 34c.

The enqueue manager 22 stores an entry P1, corresponding to message packets (not shown) in the child schedule 50 in entry 56. As described above, the entries 56 in the queues, in a particular configuration, are handles, or pointers, to an actual message payload stored in memory of the data communications device 10. In such an exemplary implementation, storage of a handle or pointer to a message payload facilitates transport of the message payload through the scheduler, however alternate configurations manipulate memory storage in another manner, such as physically copying the entire payload. Such alternate implications will be apparent to those of skill in the art.

The parent schedule 54 has a vacant entry 58 for occupancy by a child entry P1. Accordingly, the parent schedule 54 informs the child schedule 50, via a pop request, that an entry 58 is available. Note that a particular hierarchical scheduler 40, such as illustrated in FIG. 3, associates the particular parent entry 58 with the child schedule 50, encompassing all entries 33 in the child schedule 50 as potential candidates for a pop. The scheduling logic 27, as disclosed herein, selects which of the child entries 33 in the child schedule 50 the layer engine 26 advances, via a pop, to the parent schedule 54.

The child schedule 50 does not yet have an entry ready for transport. However, the child schedule 50 does not want to miss the opportunity to push an entry P1 56 to the parent schedule 54. Accordingly, the child schedule 50 pushes the message entry P1' to the deferral queue 52, as shown by entry 60 and dotted line 62. Accordingly, the parent schedule 54 holds the entry 58 opened for the child schedule for the entry P1 in the deferral queue.

At the time the message packet entry P1' arrives in the deferral queue 52 entry 60, the realtime event manager 24 computes and schedules a readiness time based on the approximate time the entry P1' will be ready to push to the available parent 54 entry 58. At the expiration of the readiness time, the realtime event manager 24 wakes the child schedule 50. At that time, the entry P1' from entry 60 in the deferral queue 52 is ready for a push, or transfer, by the layer engine 26 to the available parent schedule 54 entry 58, remaining open because of the deferral queue entry 60, as shown by arrow 64.

Alternatively, upon expiration of the readiness time, the child schedule 50 examines other available entries in the child schedule 50, such as those arriving since the transfer of message packet P1' to the deferral queue 52. Accordingly, the child schedule 50 examines the message packet P2, arriving at entry 68, to determine if the child schedule 50 should instead push the entry 68, having message packet P2, rather than push the deferred message packet P1', in the deferral queue 52. Accordingly, the child schedule 50, in response to the real time event manager 24 wakeup for the deferred push, may elect to either complete the push of message packet P1' from the deferral queue 52 entry 60, to the parent queue 54 entry P1'' 58, as shown by dotted line 64, or, may alternatively elect to push the newly arrived message packet P2, at entry 68, directly to the available entry 58 in the parent schedule 54, as shown by dotted line 70. In this manner, the child schedule 50 employees that the deferral queue 52 to retain control over the subsequent window of readiness time, and elects, at the expiration of the readiness time which message packet bracket i.e. P1 or P2, to push to the parent schedule 54. In either case, the available entry 58 in the parent schedule 54 remains available, and hence deferred, pending the wakeup of the child queue 50 by the realtime event manager 24, in response to the readiness time.

Figure 5:
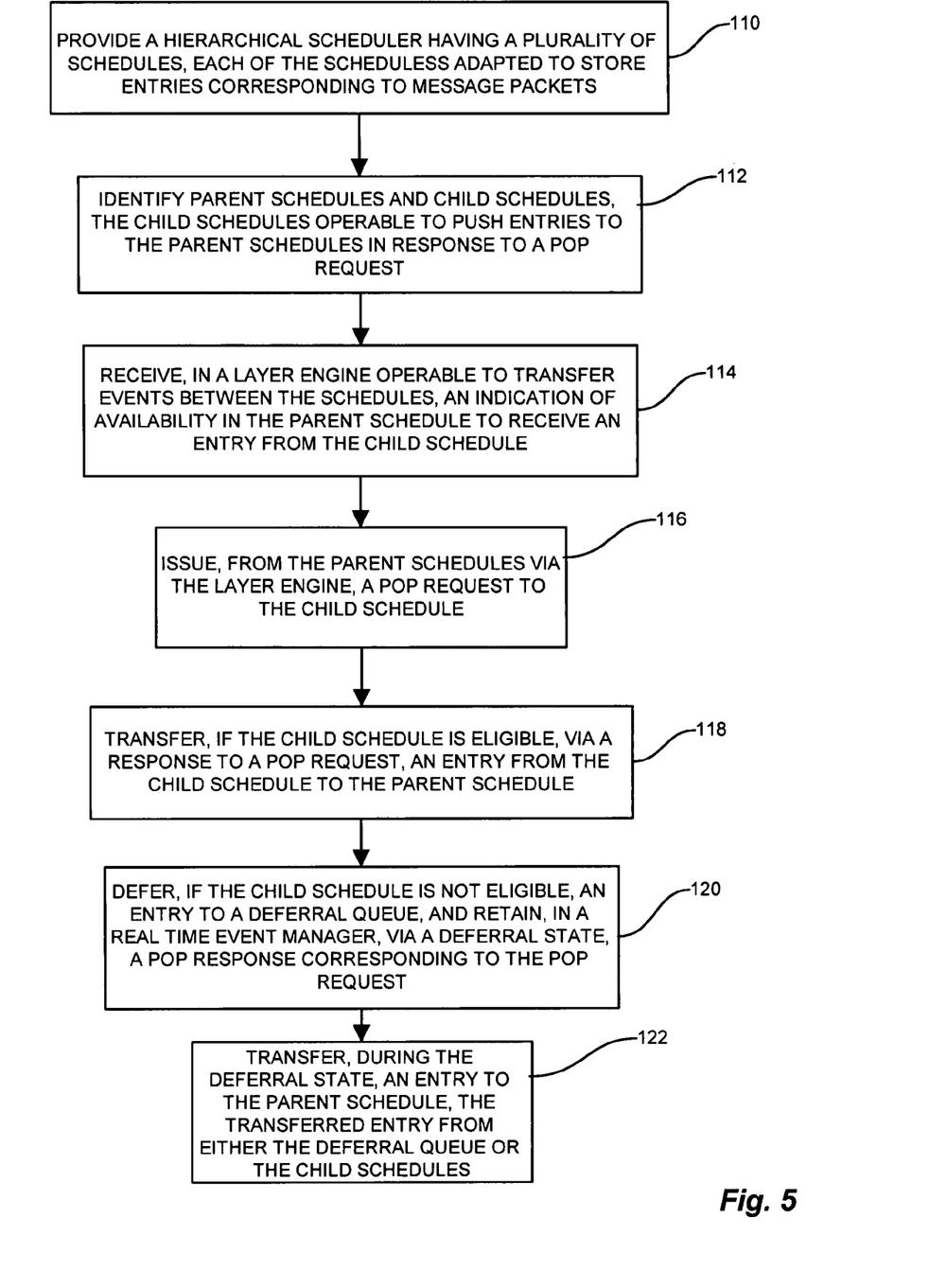
FIG. 5 is a flowchart of deferring an entry as shown in FIG. 4.

FIG. 5 is a flowchart of deferring an entry as shown in FIG. 4. Referring to FIGS. 4 and 5, the system of the present invention is shown managing interlayer notification events in a hierarchical scheduler. At step 110, the data communications device 10 provides a hierarchical scheduler 20 having a plurality of calendars, or schedules 32n, each of the schedules 32n adapted to store entries corresponding to message packets. At step 112, the layer engine 26 identifies a parent schedule 32c and a child schedule 32g, the child schedule 32g operable to push entries to the parent schedule 32c in response to a pop request. Note that the entries 32c and 32g represent exemplary parent and child schedules, respectively, however the parent/child designation applies to other schedules 32n similarly situated in such an association in the scheduling hierarchy 40.

At step 114, the child schedule 32g receives, in the layer engine 26 operable to transfer entries between the calendars 32n, an indication of availability in the parent schedule 32c to receive an entry 33 from the child schedule 32g. The parent schedule 32c obtains an available entry by a push of one of its own entries 33, such as by a push to the parent's parent or to the egress line 18 in the case of the root schedule 32a.

At step 116, the parent schedule 32c issues, via the layer engine 26, a pop request to the child schedule 32g. The child schedule 32g answers the pop request with either a push of an eligible entry, or with a deferral to the deferral queue, as will now be described. The deferral queue 28 allows the child schedule 32g to retain control over the opportunity to push an entry 33 to the parent schedule 32c, by setting a wakeup time via the real time event manager 24. Rather than respond with a nak (no entry available) to the pop request, and requiring the parent 32g to poll or pushing an entry with a future readiness time, the deferral queue 28 entry allows the child schedule to retain the opportunity to push at the future readiness time. Further, at the readiness time, the child schedule 32g need not push the deferred entry, but instead may select another entry 33 if on is more urgent or appropriate, according to the scheduling logic 27.

At step 118, the layer engine 26 transfers, if the child schedule 32g is eligible, via a response to a pop request, an entry from the child schedule 32g to the parent schedule 32c. If the child schedule 32g is ineligible, at step 120, the child schedule 32g defers, or stores, an entry to the deferral queue 28, and retains the entry in a deferral state, discussed further in FIG. 6, below, as a pop response corresponding to the pop request. The deferral queue 28 entry also determined and associates a wakeup time in the real time event manager 24 corresponding to the readiness time.

At step 122, the realtime event manager 24 wakes the child schedule 32g and transfers, during the deferral state, an entry 33 to the parent schedule 32c, the transferred entry from either the deferral queue 34c or the child schedule 32g, according to the scheduling logic as described above.

Figure 6:
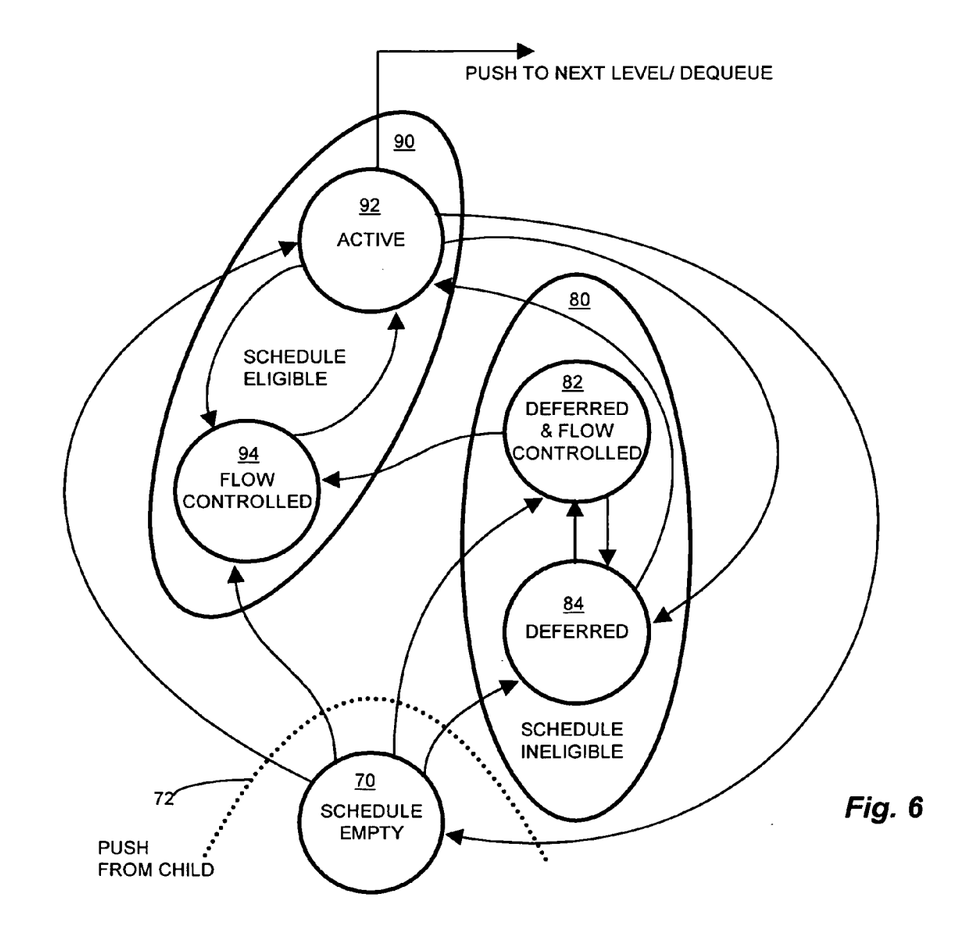
FIG. 6 is a state diagram of schedules in communication with the deferral queue of FIG. 5.

FIG. 6 is a state diagram of calendars in communication with the deferral queue 28 of FIG. 5. Referring to FIG. 6, various states of a schedule 32n and the deferral queue 28 are shown. FIG. 6 also illustrates flow control among the schedules 32n. As discussed above in the example describing rate service maximums and contractual service obligations above, flow control implements limits on the ability of a particular schedule 32n to push, or further advance, entries towards the root 32a, for subsequent transmission on the egress lines 18.

Referring to FIGS. 3, 4 and 6, a child schedule 50 responds as a state machine. The schedule 50 may be flow controlled, as determined by the scheduling logic 27, and which includes limits on service rate and other factors maintained by the scheduling logic 27. When the schedule is empty 70, it is neither eligible nor ineligible. When the schedule is eligible 90, it may push an entry 33 (actually an entry handle) to the parent 54. When it is deferred, and pending availability of an entry to send, it is in the ineligible state 80, and may push an entry 33 at wakeup time, when it transitions to the eligible state 90. Once the active schedule 50 pushes, or dequeues, an entry to the parent 54, it returns to either the ineligible state 80 or the empty state 70, depending on whether it has other entries 33 waiting for service.

In further detail, an empty schedule 70 has no message packet entries 33, and transitions upon receipt of at least one entry 33 via a push from the child 50, shown by dotted line 72. The empty state schedule 70 transitions to either a deferred state 84, the deferred and flow control state 82 or flow control state 94. The former refers to the ineligible state 80, in which the schedule 50 has no entries ready to push to a parent 58 schedule issuing a pop request. The latter refers to ineligible state 90 in which the schedule does have entries available to push to a requesting parent 54.

If the new entry is ready for transmission, or a push, then the schedule transitions to state 94 as it is eligible, but in the flow control state. Such a state corresponds to the dotted line 66 in FIG. 4, in which the child schedule 50 need not wait in a deferred state 82 or 84. Conversely, if the new entry P1 is not ready for a push, then the child schedule 50 defers the pending entry by creating a deferral entry P1' in the deferral queue 52, and achieves the ineligible state 80. Depending upon whether flow control is active, the calendar transitions to the deferred state 84, if no flow control is active, or to state 82 is flow control is active. Such a transition corresponds to dotted line 62, as the entry is now pending in the deferral queue 52.

Upon expiration of the readiness time, set upon entering state 80, the entry P1' is now ready for transmission. Accordingly, if the schedule is in state 84, it transitions to the active state 92, and it is ready to push an entry, such as P1, to the parent schedule 54. If flow control is still in effect, the transition is from state 82 to state 94, eligible but flow control. From state 94, the flow controlled entry P1 will transition to the active state 92 according to the flow control status. The flow control status may include expiration of a certain time window in which additional bandwidth is available, for example.

From the active state 92, the schedule is ready to push to the parent schedule 54 as shown by arrow 96, and corresponding to the dotted line 64 in FIG. 4. Once the child schedule 50 successfully pushes the entry P1" to the parent 54, it returns to the schedule empty state 70, if there are no other entries in the schedule 50 or to the deferred state 84, if other entries remain to advance to the parent schedule 54.

The deferral entries in the deferral queue 52 as described herein are exemplary only. The child entries in the child schedule 50 need not actually be transported to an alternate data structure encompassing a deferral queue 28 area. Rather, such deferral entries P1' may correspond to a flag such as a ready bit, logically manipulating entries and readiness times in the child schedule 50 to indicate eligibility to push an entry from the child 50 to the parent 54.

In a particular configuration, such data structures and states may be employed as follows. More specifically, when a parent schedule 54 makes a pop request to the child schedule 50, and the child 50 reports "empty" because it is either real time ineligible or flow-controlled, the child scheduling layer sets a state bit indicating the parent tried unsuccessfully to pop (retrieve) an entry, and then goes to sleep until it can satisfy the parent's request. When the child "wakes up" at a later point because it becomes eligible again, and sees the state bit set, it can provide a packet to the parent schedule at that time.

One particular configuration in which to view the implementation of the realtime event manager 24 is as an array of linked lists forming an event queue (sometimes called an event wheel, or time wheel). Each entry in the array corresponds to a given time, and each entry contains a list of events (whole schedules) that need to be "woken up" at that time. At any given time, the first element in the event wheel is the "ready list" (which may be empty), i.e. the list of things to be done "now". There may be multiple events in the "ready list". Ideally, all of these events should happen immediately. However, only one (or a small number) of such events can typically be taken off the ready" list during one scheduling decision.

Flow control wake-up events can just be thought of as events that are always scheduled for "now" (added to the ready list), rather than for a future time (added to a later list in the event wheel). It is important to note that not all flow control events have this effect. Only if the parent 54 attempted to pop from a flow controlled schedule would a subsequent deassertion of flow control lead to a wake-up.

The time wheel described above is an alternate data structure described herein as a deferral queue 28. During the operation of one layer in the scheduling hierarchy 40, each scheduling operation results in a "best" entry sorted in the first and second tier sorting trees. The eligibility time of the earlier of these two "best" entries, represents the eligibility time of the schedule itself. In addition, when the parent requests an ineligible child schedule for a packet handle, an "empty" response is popped to the parent, and the node sets a bit indicating that the parent schedule 54 had requested a handle but did not receive the requested child schedule 50 entry.

There are three ways in which the child schedule 50 can become eligible again. First, enough real time could elapse that it is at the head of the list of eligible nodes in the deferred queue. Second, if the node had been flow controlled, that flow control could be de-asserted. Finally, if the flow were ineligible and not flow controlled, then a wakeup of any eligible entry of the schedule could render the entire schedule eligible.

If the node had been previously queried by the parent when it was ineligible, a bring-back event pop is performed and the result is sent to the parent, and is treated by the parent as a new arrival.

It should be noted that the child schedule 50 performs the same number of pops regardless of its eligibility. If the schedule was ineligible when the parent pop arrived, the event manger 24 responds empty without consulting the sorting trees. Then, as stated above, when the child once again becomes eligible, a true pop is performed from the sorting trees.

Referring again to FIG. 3, such scheduling logic 27 is deliverable to the data communications device 10 in the form of a configuration object, such as a datafile 49, which specifies the scheduling hierarchy 30 and structure, and therefore the number of layers 36n, number of calendars 32n and, and the scheduling logic 40 for traversing the scheduling hierarchy 30. The scheduling logic is deliverable by any suitable means to a data communications device 10 having a scheduler 20. Such configuration objects may be delivered on CD ROM 98, floppy disk, downloaded from web site via the Internet, or other suitable means for transporting deliverable code.

Those skilled in the art should readily appreciate that the programs and methods encoded on transport media for defining hierarchical schedulers as defined herein are deliverable to a data communications device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer (e.g. a set of processors and memory) through communication media, for example using baseband signaling or broadband signaling techniques, as in an electronic network such as the Internet or telephone modem lines. The operations and methods may be implemented in a software executable object or as a set of instructions embedded in a carrier wave. Alternatively, the operations and methods may be embodied in whole or in part using hardware components, such as Application Specific Integrated Circuits (ASICs), state machines, controllers or other hardware components or devices, or a combination of hardware, software, and firmware components.

While the system and method for defining hierarchical schedulers has been particularly shown and described with references to embodiments thereof, it will be understood by those skilled in the art that various changes in form and details may be made therein without departing from the scope of the invention encompassed by the appended claims. Accordingly, the present invention is not intended to be limited except by the following claims.

What is claimed is:

1. A method for managing interlayer notification events in a hierarchical scheduler comprising:

receiving, in a layer engine, a request to transfer an entry from a child schedule to a parent schedule;

determining, by a real time event manager in the layer engine, whether to defer, via an entry in a deferral queue, the entry from the child schedule to the parent schedule; and recomputing, if the entry was deferred, whether to transfer the deferred entry, and if the recomputing indicates retaining the deferred event, transferring another entry from the child schedule to the parent schedule.

2. The method of claim 1 further comprising computing a wakeup time, the wakeup time corresponding to the time at which the recomputing whether to transfer the deferred entry occurs.

3. The method of claim 2 further comprising:

if the determining indicates deferring the entry, transferring, by the layer engine, the entry from the child schedule to the deferral queue; and setting, in the realtime event manager, the wakeup of the child schedule at the computed wakeup time.

4. The method of claim 1 wherein recomputing includes examining intervening entries in the child schedule, the intervening entries comprising entries arriving since the deferring.

5. The method of claim 1 wherein each of the schedules comprise a set of states, the states indicative of an active state, in which the schedule is available to transfer an event, an ineligible state, in which the schedule is pending a deferred entry from the child schedule, and an empty state, in which the schedule has no pending entries.

6. The method of claim 1 wherein the request to transfer is a pop request indicative of availability in the parent schedule, and deferring in the deferral queue further includes a deferral ack from the child schedule to the parent schedule in response to the pop request.

7. The method of claim 6 wherein the pop request and the deferral ack further comprise a state machine, the deferral ack establishing a deferral state in the child schedule, the deferral state retained by the child schedule until the redetermining.

8. The method of claim 7 wherein the pop request initiates a pending push state in the parent schedule, the pending push indicative of an available entry retained in the parent to receive an entry from the child schedule.

9. The method of claim 1 wherein the deferral queue further comprises one deferred entry from the child queue.

10. A data communications device for managing interlayer notification events in a hierarchical scheduler comprising:

a layer engine operable to receive a request to transfer an entry from a child schedule to a parent schedule;

a realtime event manager operable to determine whether to defer the entry from the child schedule to the parent schedule; and a deferral queue responsive to the realtime event manager and the layer engine and operable to store an indicator to the deferred entry, the realtime event manager further operable to recompute, if the entry was deferred as a result of determining, whether to transfer the deferred entry and, if the recomputing indicates retaining the deferred event, transfer another entry from the child schedule to the parent schedule.

11. The data communications device of claim 10 wherein the realtime event manager is operable to compute a wakeup time, the wakeup time corresponding to the time at which the recomputing occurs.

12. The data communications device of claim 11 wherein, if the determining indicates deferring the entry, the layer engine is further operable to transfer the entry from the child schedule to the deferral queue, the realtime event manager being operable to set the wakeup of the child schedule at the computed wakeup time.

13. The data communications device of claim 10 wherein the realtime event manager is operable to recompute, by examining intervening entries in the child schedule, the intervening entries comprising entries arriving since the deferring.

14. The data communications device of claim 10 wherein the layer engine is a state machine, the child schedule and the parent schedule further comprising a set of states, the states indicative of an active state, in which the parent is available to transfer an entry, an ineligible state, in which the parent is pending a deferred entry from the child schedule, and an empty state, in which the child schedule has no pending entries.

15. The data communications device of claim 10 wherein the request to transfer is a pop request indicative of availability in the parent schedule, and if the entry was deferred as a result of determining, the deferral further initiates a deferral ack from the child schedule to the parent schedule.

16. The data communications device of claim 15 wherein the pop request and the deferral ack further comprise a state machine, the deferral ack establishing a deferral state in the child schedule, and the deferral state retained by the child schedule until the redetermining.

17. The data communications device of claim 16 wherein the pop request is operable to initiate a pending push state in the parent schedule, the pending push indicative of an available entry retained in the parent to receive an entry from the child schedule.

18. The data communications device of claim 10 wherein the deferral queue further comprises one deferred entry from the child queue.

19. A method for managing interlayer notification events in a hierarchical scheduler comprising:
   providing a hierarchical scheduler having a plurality of calendars, each of the calendars adapted to store entries corresponding to message packets;
   identifying a parent schedule and a child schedule, the child schedule operable to push entries to the parent schedule in response to a pop request;
   receiving, in a layer engine operable to transfer events between the calendars, an indication of availability in the parent schedule to receive an entry from the child schedule;
   issuing, from the parent schedule via the layer engine, a pop request to the child schedule;
   transferring, if the child schedule is eligible; via a response to a pop request, an entry from the child schedule to the parent schedule;
   deferring, if the child schedule is not eligible, an entry to a deferral queue, and retaining, in a real time event manager, via a deferral state, a pop response corresponding to the pop request; and
   transferring, during the deferral state, an entry to the parent schedule, the transferred entry from either the deferral queue or the child schedule.

20. A computer readable storage medium storing computer program logic embodied in computer program code for managing interlayer notification events in a hierarchical scheduler comprising:
   computer program code for receiving, in a layer engine, a request to transfer an entry from a child schedule to a parent schedule;
   computer program code for determining, by a real time event manager in the layer engine, whether to defer, via an entry in a deferral queue, the entry from the child schedule to the parent schedule; and
   computer program code for recomputing, if the entry was deferred, whether to transfer the deferred entry and, if the recomputing indicates retaining the deferred event, transferring another entry from the child schedule to the parent schedule.

21. A data communications device for managing interlayer notification events in a hierarchical scheduler comprising:
   means for receiving, in a layer engine, a request to transfer an entry from a child schedule to a parent schedule;
   means for determining, by a real time event manager in the layer engine, whether to defer, via an entry in a deferral queue, the entry from the child schedule to the parent schedule; and
   means for recomputing, if the entry was deferred, whether to transfer the deferred entry and, if the recomputing indicates retaining the deferred event, transferring another entry from the child schedule to the parent schedule.

22. The data communications device of claim 10 wherein the deferral queue comprises a data structure operable to indicate, for each of the entries in the scheduler, an eligibility state and a deferral state, the eligibility state and deferral state indicative of an ability to push the entry from the child schedule to the parent schedule.

23. The data communications device of claim 22 wherein the data structure further comprises an array of linked lists, each of the elements of the array corresponding to a readiness time indicative of the eligibility of the entries corresponding to that linked list.

* * * * *